US009256283B2

(12) United States Patent
Kang

(10) Patent No.: US 9,256,283 B2
(45) Date of Patent: Feb. 9, 2016

(54) MOBILE TERMINAL AND METHOD OF CONTROLLING OPERATION THEREOF

(75) Inventor: Heejoon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 566 days.

(21) Appl. No.: 13/467,899

(22) Filed: May 9, 2012

(65) Prior Publication Data

US 2012/0302289 A1 Nov. 29, 2012

(30) Foreign Application Priority Data

May 27, 2011 (KR) .................... 10-2011-0050707

(51) Int. Cl.
*H04B 1/38* (2015.01)
*G06F 3/01* (2006.01)
*G02B 27/01* (2006.01)
*H04M 1/725* (2006.01)

(52) U.S. Cl.
CPC .............. *G06F 3/011* (2013.01); *G02B 27/017* (2013.01); *G06F 3/013* (2013.01); *G06F 3/016* (2013.01); *G06F 3/017* (2013.01); *H04M 1/7253* (2013.01); *G02B 2027/014* (2013.01); *G02B 2027/0138* (2013.01)

(58) Field of Classification Search
CPC .......... H04W 52/0254; H04W 52/027; H04W 88/06
USPC ......... 455/41.2, 41.3, 418–420, 550.1, 556.1, 455/575.1, 575.2, 575.6; 715/863; 345/6, 8, 345/158, 419, 632, 633; 348/47, 53
See application file for complete search history.

(56) References Cited

U.S. PATENT DOCUMENTS

| | | | |
|---|---|---|---|
| 6,771,294 B1 | 8/2004 | Pulli et al. | 345/863 |
| 2006/0284791 A1* | 12/2006 | Chen et al. | 345/8 |
| 2010/0199232 A1* | 8/2010 | Mistry et al. | 715/863 |
| 2011/0001699 A1* | 1/2011 | Jacobsen et al. | 345/157 |
| 2011/0130112 A1* | 6/2011 | Saigh et al. | 455/404.1 |
| 2012/0058801 A1* | 3/2012 | Nurmi | 455/566 |

OTHER PUBLICATIONS

Korean Office Action dated Jun. 7, 2012 issued in Application No. 10-2011-0050707.

* cited by examiner

*Primary Examiner* — Olumide T Ajibade Akonai
*Assistant Examiner* — Natasha Cosme
(74) *Attorney, Agent, or Firm* — Ked & Associates, LLP

(57) ABSTRACT

A mobile terminal and a method of controlling an operation thereof are disclosed. In the method of controlling the operation of the mobile terminal, the mobile terminal is communicatively with a head mounted display for displaying an augmented reality (AR) screen obtained by combining a virtual image with a real environment. If image data acquired through a camera is analyzed and a predetermined gesture input is detected, the head mounted display is controlled such that a display change corresponding to the detected gesture input is displayed on the AR screen. In a state of displaying the AR screen through the head mounted display, various operations related to the mobile terminal can be controlled according to the predetermined gesture input.

24 Claims, 20 Drawing Sheets

MOBILE TERMINAL AND METHOD OF CONTROLLING OPERATION THEREOF

CROSS-REFERENCE TO RELATED APPLICATION

This application claims the priority benefit of Korean Patent Application No. 10-2011-0050707, filed on May 27, 2011, in the Korean Intellectual Property Office, the disclosure of which is incorporated herein by reference.

BACKGROUND OF THE INVENTION

1. Field of the Invention

The present invention relates to a mobile terminal and a method of controlling operation thereof and, more particularly, to a mobile terminal capable of controlling an operation using a gesture input in a state of displaying an augmented reality screen through a head mounted display and a method of controlling an operation thereof.

2. Description of the Related Art

A mobile terminal is a portable device having at least one of a function for performing voice and video communication, a function for inputting and outputting information, and a function for storing data. Such a mobile terminal has complicated functions such as photographing of photos, capturing of moving images, playback of music files or moving image files, reception of games or broadcasts, or wireless Internet and has been implemented as a multimedia player, as the functions thereof have been diversified. New attempts have been variously given to the mobile terminal implemented as the multimedia player in hardware or software in order to implement complicated functions.

Recently, an augmented reality (AR) technique has been applied to a mobile terminal and has been variously used. The AR technique refers to a computer graphics method of combining a virtual object or information with a real environment such that the object appears to be present in the original environment. As an example of the AR technique, if a peripheral building is captured through a camera of a mobile terminal, an AR screen for displaying information about the building, such as a telephone number or a homepage, may be displayed. The AR screen may be displayed using a glasses-type head mounted display which is connected to the mobile terminal by wire or wirelessly.

However, a method of controlling an operation associated with a mobile terminal through a menu screen displayed on the mobile terminal in a state in which a user wears a head mounted display and views an AR screen is disadvantageous in that the screen size of the mobile terminal is small or a disparity may be changed.

Therefore, in order to conveniently control an operation associated with a mobile terminal in a state in which a user views an AR screen through a head mounted display connected to the mobile terminal, there is a need to control the operation of the mobile terminal using a new input/output method different from a conventional input/output method.

SUMMARY OF THE INVENTION

Therefore, the present invention has been made in view of the above problems, and it is an object of the present invention to provide a mobile terminal capable of controlling various operations using a gesture input in a state of displaying an augmented reality (AR) screen through a head mounted display, and a method of controlling an operation thereof.

In accordance with an aspect of the present invention, the above and other objects can be accomplished by the provision of a method of controlling an operation of a mobile terminal, the method including communicatively connecting the mobile terminal with a head mounted display for displaying an augmented reality (AR) screen obtained by combining a virtual image with a real environment, analyzing image data acquired through a camera and detecting a predetermined gesture input, and controlling the head mounted display such that a display change corresponding to the detected gesture input is displayed on the AR screen.

In accordance with another aspect of the present invention, there is provided a mobile terminal including a wireless communication unit configured to communicatively connect the mobile terminal with a head mounted display for displaying an augmented reality (AR) screen obtained by combining a virtual image with a real environment, and a controller configured to analyze image data acquired through a camera to detect a predetermined gesture input and control the head mounted display such that a display change corresponding to the detected gesture input is displayed on the AR screen.

In accordance with another aspect of the present invention, there is provided a system including a head mounted display configured to display an augmented reality (AR) screen obtained by combining a virtual image with a real environment, and a mobile terminal communicatively connected to the head mounted display and configured to analyze image data acquired through a camera to detect a predetermined gesture input and control the head mounted display such that a display change corresponding to the detected gesture input is displayed on the AR screen.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described with reference to the attached drawings.

A mobile terminal described in the present specification includes a mobile phone, a smart phone, a laptop, a digital broadcast terminal, a personal digital assistant (PDA), a portable multimedia player (PMP), a camera, a navigation system, a tablet computer, an e-book terminal, etc. The terms "module" and "unit" attached to describe the names of components are used herein to help the understanding of the components and thus they should not be considered as having specific meanings or roles. Accordingly, the terms "module" and "unit" may be used interchangeably.

Figure 1:
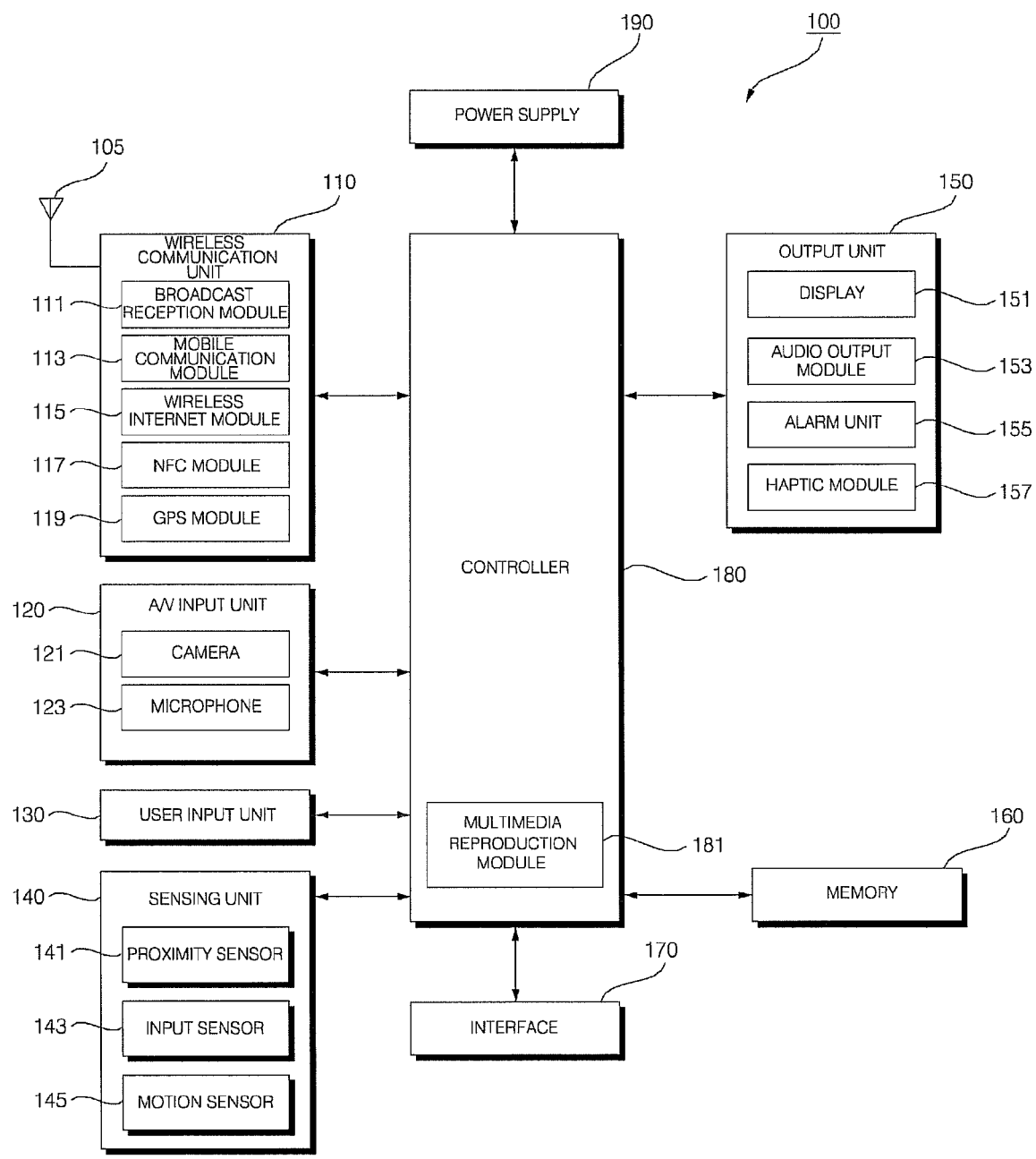
FIG. 1 is a block diagram showing the configuration of a mobile terminal according to an embodiment of the present invention.

FIG. 1 is a block diagram showing the configuration of a mobile terminal according to an embodiment of the present invention. The components of the mobile terminal according to the embodiment of the present invention will be described with reference to FIG. 1.

Referring to FIG. 1, the mobile terminal 100 may include a wireless communication system 110, an audio/video (A/V) input unit 120, a user input unit 130, a sensing unit 140, an output unit 150, a memory 160, an interface 170, a controller 180 and a power supply 190. Two or more components may be combined into one component or one component may be divided into two or more components, as necessary.

The wireless communication unit 110 may include a broadcast reception module 111, a mobile communication module 113, a wireless Internet module 115, a near field communication (NFC) module 117, a global positioning system (GPS) module 119, etc.

The broadcast reception module 111 receives at least one of a broadcast signal and broadcast-related information from an external broadcast management server through a broadcast channel. The broadcast channel may include a satellite channel and a terrestrial channel. The broadcast management server may refer to a server for generating and transmitting at least one of a broadcast signal and broadcast-related information or a server for receiving and transmitting at least one of a previously generated broadcast signal and broadcast-related information to a terminal.

The broadcast signal may include not only a TV broadcast signal, a radio broadcast signal and a data broadcast signal but also a broadcast signal obtained by combining a TV broadcast signal or a radio broadcast signal with a data broadcast signal. The broadcast-related information may refer to information related to a broadcast channel, a broadcast program or a broadcast service provider. The broadcast-related information may be provided via a mobile communication network and, in this case, may be received by the mobile communication module 113. The broadcast-related information may have various formats.

The broadcast reception module 111 receives a broadcast signal using various broadcast systems. More particularly, the broadcast reception module 111 may receive a digital broadcast signal using a digital broadcast system such as digital multimedia broadcasting-terrestrial (DMB-T), digital multimedia broadcasting-satellite (DMB-S), Media Forward Link Only (MediaFLO), digital video broadcast-handheld (DVB-H) or integrated services digital broadcast-terrestrial (ISDB-T). The broadcast reception module 111 may be configured to suit not only a digital broadcast system but also all broadcast systems for providing broadcast signals. The broadcast signal and/or the broadcasted-related information received through the broadcast reception module 111 may be stored in the memory 160.

The mobile communication module 113 transmits or receives a wireless signal to or from at least one of a base station, an external terminal and a server over a mobile communication network. The wireless signal may include a voice call signal, a video call signal or various types of data associated with transmission and reception of a text/multimedia message.

The wireless Internet module 115 is an internal or external module for wireless Internet access which may be provided to the mobile terminal 100. As wireless Internet technologies, Wireless LAN (WLAN)(Wi-Fi), Wireless broadband (WiBro), World Interoperability for Microwave Access (WiMax) or High Speed Downlink Packet Access (HSDPA), etc. may be used.

The NFC module 117 may perform NFC. As NFC technologies, Bluetooth, Radio Frequency Identification (RFID), Infrared Data Association (IrDA), Ultra Wideband (UWB), ZigBee, etc. may be used.

The GPS module 119 may receive position information from a plurality of GPS satellites.

The A/V input unit 120 receives an audio signal or a video signal and may include a camera 121 and a microphone 123. The camera 121 processes a video frame of a still image or a moving image obtained by an image sensor in a video call mode or a photographing mode. The processed video frame may be displayed on the display 151.

The video frame processed by the camera 121 may be stored in the memory 160 or externally transmitted through the wireless communication unit 110. The number of cameras 121 may be two or more according to the configuration of the terminal.

The microphone 123 receives an external audio signal in a call mode, a recording mode or a voice recognition mode and converts the external audio signal into electrical audio data. The processed audio data may be converted into a format transmittable to a mobile communication base station through the mobile communication module 113 to be output in a call mode. The microphone 123 may use various noise elimination algorithms for eliminating noise generated in a process of receiving the external audio signal.

The user input unit 130 generates key input data enabling the user to control the operation of the terminal. The user input unit 130 may include a keypad, a dome switch, a touchpad (static pressure/static electrical), etc., which are capable of receiving a command or information by a push or touch operation of the user. The user input unit 130 may include a jog wheel for rotating a key, a joystick, a finger mouse, etc. In particular, if the touchpad and the display 151 have a layered structure, it may be called a touchscreen.

The sensing unit 140 detects a current state of the mobile terminal 100 such as whether the mobile terminal 100 is opened or closed, the position of the mobile terminal 100 and contact/non-contact of a user and generates a sensing signal for controlling the operation of the mobile terminal 100. For example, if the mobile terminal 100 is a slide phone, the sensing unit 140 may sense whether the slide phone is opened or closed. The sensing unit 140 may sense whether or not the power supply 190 supplies power or whether or not an external device is connected through the interface 170.

The sensing unit 140 may include a proximity sensor 141, a pressure sensor 143 and a motion sensor 145. The proximity sensor 141 detects presence/absence of an object which approaches the mobile terminal 100 or an object located in the vicinity of the mobile terminal 100 without mechanical contact. The proximity sensor 141 may detect an object approaching the mobile terminal using a change in an AC magnetic field, a change in a static magnetic field or a rate of change in capacitance. The number of proximity sensors 141 may be two or more according to the configuration of the terminal.

The pressure sensor 143 may detect whether pressure is applied to the mobile terminal 100 or the level of the pressure. The pressure sensor 143 may be mounted at a position where pressure applied to the mobile terminal 100 needs to be detected according to a use environment. If the pressure sensor 143 is mounted in the display 151, a touch input through the display 151 and a pressure touch input having pressure greater than that of the touch input may be identified. The level of pressure applied to the display 151 may be detected according to the signal output from the pressure sensor 143 upon the pressure touch input.

The motion sensor 145 may sense motion or position of the mobile terminal 100 using an acceleration sensor, a gyroscopic sensor, etc. In particular, as the gyroscopic sensor which may be used in the motion sensor 145, a sensor for converting an acceleration change in one direction into an electrical signal has been widely used with development of a micro-electromechanical system (MEMS). The acceleration sensor may include various sensors such as an acceleration sensor which may be mounted in an airbag system of a vehicle to measure acceleration having a large value used to detect collision and an acceleration sensor which may measure acceleration having a small value used as an input means of a game console. Two-axis or three-axis acceleration sensors may be mounted in one package or only a Z-axis acceleration sensor may be mounted according to use environment. Accordingly, for certain reasons, if a X-axis or Y-axis acceleration sensor is used instead of the Z-axis acceleration sensor, the acceleration sensor may be mounted on a main board in an erect state using a separate board piece.

The gyroscopic sensor measures an angular speed and senses a direction (angle) in which the mobile terminal rotates from a reference direction.

The output unit 150 outputs an audio signal, a video signal or an alarm signal. The output unit 150 may include a display 151, an audio output module 153, an alarm unit 155 and a haptic module 157.

The display 151 displays information processed by the mobile terminal 100. For example, if the mobile terminal 100 is in a call mode, the display displays a user interface (UI) or a graphical user interface (GUI). If the mobile terminal 100 is in a video call mode or a photographing mode, the display may individually or simultaneously display the photographed or received images and display a UI and a GUI.

As described above, if the display 151 and the touchpad have the layered structure to configure the touchscreen, the display 151 can be used not only as an output device but also as an input device for inputting information via touch.

If the display 151 is a touchscreen, the display may include a touchscreen panel, a touchscreen panel controller, etc. In this case, the touchscreen panel is a transparent panel attached to the outside of the display and may be connected to an internal bus of the mobile terminal 100. The touchscreen panel receives a touch input and sends a signal corresponding to the touch input to the touchscreen panel controller. The touchscreen panel controller processes the received signal, transmits data corresponding to the signal to the controller 180, and enables the controller 180 to detect whether the touch input is received or which portion of the touchscreen is touched.

The display 151 may include e-paper. The e-paper may be a reflection type display and has high resolution, wide viewing angle and excellent visual characteristics due to a bright white background, similarly to paper and ink. The e-paper may be implemented on a certain board such as plastic, metal, or paper, an image is maintained even after power is turned off, and the lifespan of the battery of the mobile terminal 100 may be increased because a backlight power source is not used. As the e-paper, a semispherical twisted ball charged with electric charges, electrophoresis, a microcapsule, etc. may be used.

The display 151 may include at least one of a liquid crystal display, a thin film transistor-liquid crystal display, an organic light emitting diode, a flexible display and a 3-dimensional (3D) display. The number of displays 151 may be two or more according to implementations of the mobile terminal 100. For example, the mobile terminal 100 may include both an external display (not shown) and an internal display (not shown).

The audio output module 153 may output audio data received from the wireless communication module 110 or stored in the memory 160 in call signal reception, a call mode, a recording mode, a voice recognition mode or a broadcast reception mode. The audio output module 153 outputs an audio signal associated with the functions performed by the mobile terminal 100, such as call signal reception sound or message reception sound. The audio output module 153 may include a speaker, a buzzer, etc.

The alarm unit 155 outputs a signal notifying the user that an event has occurred in the mobile terminal 100. Examples of the event which has occurred in the mobile terminal 100 include call signal reception, message reception, key signal input, etc. The alarm unit 155 outputs a signal notifying the user of the occurrence of an event in the other form in addition to an audio or video signal. For example, the alarm unit may output the signal in the form of vibrations. If a call signal or a message is received, the alarm unit 155 may output a signal notifying the user that the call signal or the message has been received. If a key signal is received, the alarm unit 155 may output a signal as a feedback signal of the key signal. The user may recognize occurrence of the event through the signal output from the alarm unit 155. The signal notifying the user that the event has occurred in the mobile terminal 100 may be output through the display 151 or the audio output module 153.

The haptic module 157 generates a variety of tactile effects that the user can feel. A typical example of the tactile effect generated by the haptic module 157 is vibration. If the haptic module 157 generates vibrations as a tactile effect, the intensity and pattern of the vibrations generated by the haptic module 157 may be changed and different vibrations may be combined and output or may be sequentially output.

The haptic module 157 may generate a variety of tactile effects such as an effect due to stimulus through arrangement of pins which vertically move with respect to a contact skin surface, an effect due to stimulus through air ejection force or absorption force through an ejection hole and an absorption hole, an effect due to stimulus through contact of an electrode, an effect due to stimulus using electrostatic force, or an effect due to cold and warmth using a heat absorption or heating element. The haptic module 157 may deliver the tactile effect through direct contact or enable the user to feel the tactile effect through kinaesthesia of a finger or arm of the user. The number of haptic modules 157 may be two or more according to the configuration of the mobile terminal 100.

The memory 160 may store a program for processing and control of the controller 180 and may temporarily store input or output data (for example, a phonebook, messages, audio, still images, and moving images).

The memory 160 may include at least one of a flash memory type, hard disk type, multimedia card micro type or card type memory (e.g., an SD or XD memory, etc.), a RAM and a ROM. The mobile terminal 100 may manage web storage for performing a storage function of the memory 150 over the Internet.

The interface 170 serves as an interface with all external devices connected to the mobile terminal 100. Examples of the external device connected to the mobile terminal 100 include a wired/wireless headset, an external charger, a wired/ wireless data port, a card socket such as a memory card, a subscriber identification module (SIM) card or a user identity module (UIM) card, an audio input/output (I/O) terminal, a video I/O terminal, and an earphone. The interface 170 may receive data from an external device or receive power and transmit power to the components of the mobile terminal 100 or transmit data of the mobile terminal 100 to an external device.

The interface 170 may become a passage through which power is supplied from an external cradle to the mobile terminal 100 when the mobile terminal is connected to the external cradle or a passage through which a variety of command signals received from the cradle by the user is delivered to the mobile terminal 100.

The controller 180 controls the operations of the units and controls the overall operation of the mobile terminal 100. For example, the controller performs control and processing associated with a voice call, data communication, a video call, etc. The controller 180 may include a multimedia reproduction module 181 for multimedia reproduction. The multimedia reproduction module 181 may be implemented in the controller 180 in hardware form or may be implemented in software form separately from the controller 180.

The power supply 190 receives external power or internal power and supplies power required for operation to each component under control of the controller 180.

The mobile terminal 100 having the above configuration includes a wired/wireless communication system and a satellite based communication system so as to operate in a communication system for transmitting data through a frame or packet.

Figure 2:
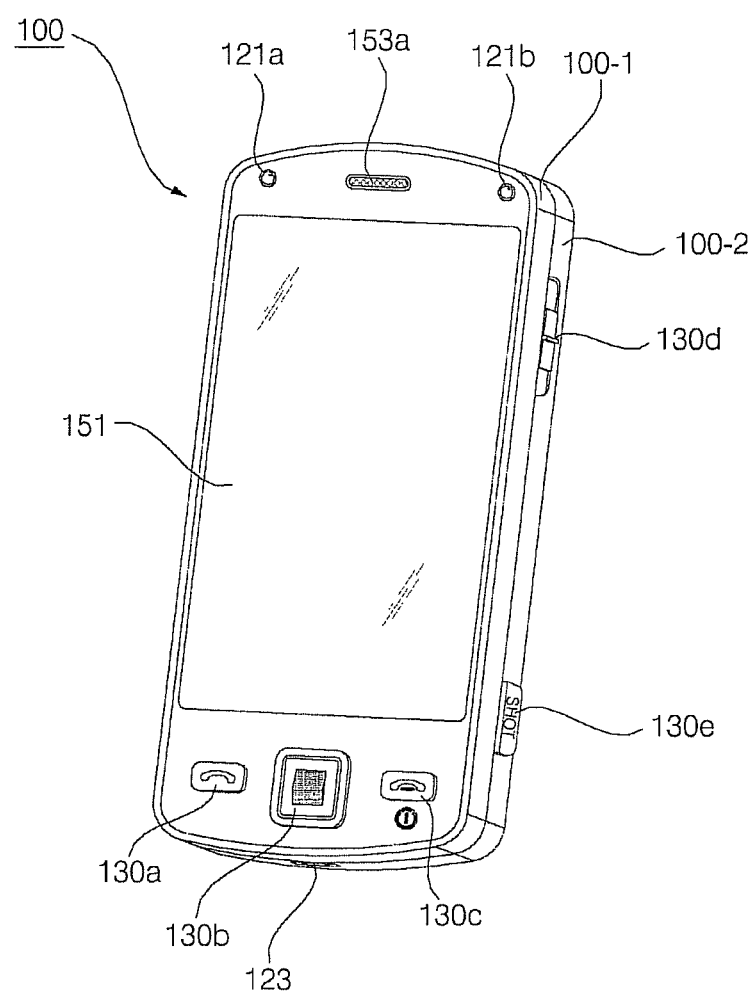
FIG. 2 is a perspective view of a mobile terminal according to an embodiment of the present invention when viewed from a front side thereof.
Figure 3:
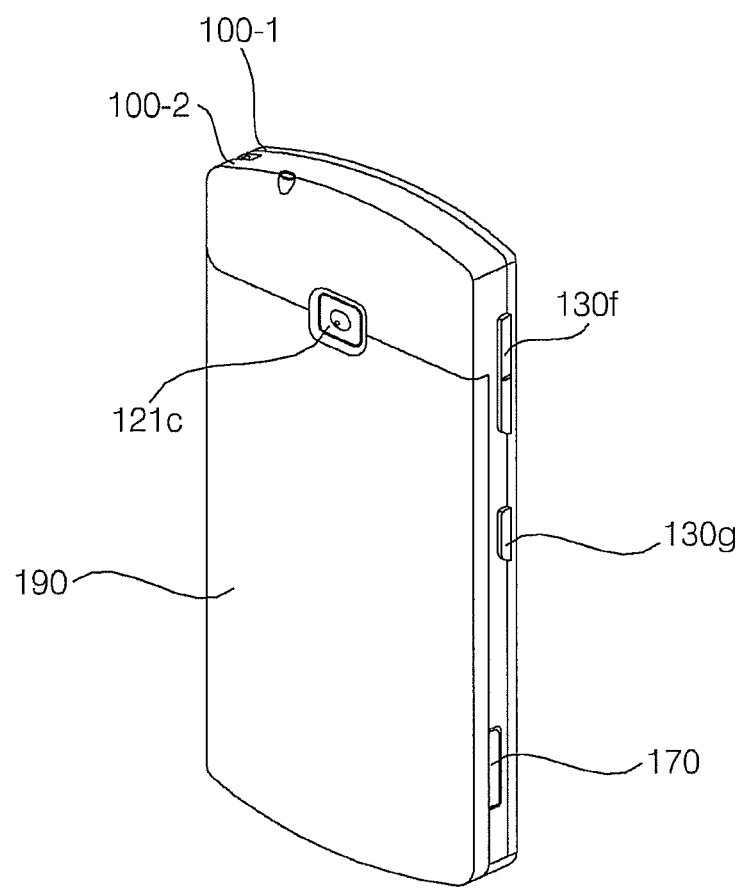
FIG. 3 a perspective view of the mobile terminal shown in FIG. 2 when viewed from a rear side thereof.

FIG. 2 is a perspective view of a mobile terminal according to an embodiment of the present invention when viewed from a front side thereof, and FIG. 3 a perspective view of the mobile terminal shown in FIG. 2 when viewed from a rear side thereof. Hereinafter, the appearance of the mobile terminal according to the present invention will be described with reference to FIGS. 2 and 3. Hereinafter, for convenience, among folder type, bar type, swing type and slider type mobile terminals, a bar type mobile terminal including a touchscreen at a front side thereof will be described. However, the present invention is not limited to the bar type mobile terminal and is applicable to all types of mobile terminals including the above-described types.

Referring to FIG. 2, a case forming the appearance of the mobile terminal 100 includes a front case 100-1 and a rear case 100-2. In a space formed by the front case 100-1 and the rear case 100-2, various electronic parts are mounted.

In a main body, that is, in the front case 100-1, a display 151, a first audio output module 153a, a first camera 121a and first to third user input units 130a, 130b and 130c are arranged. A fourth user input unit 130d, a fifth user input unit 130e and a microphone 123 may be arranged on the side surface of the rear case 100-2.

The display 151 and a touch pad have the layered structure to configure the touch screen so as to enable the user to input information through touch.

The first audio output module 153a may be implemented in the form of a receiver or a speaker. The first camera 121a may be implemented in a form suitable for photographing an image of the user or capturing moving image of the user. The microphone 123 may be implemented in a form suitable for receiving user voice or other sounds.

The first to fifth user input units 130a, 130b, 130c, 130d and 130e and the below-described sixth and seventh user input units 130f and 130g may be collectively referred to as a user input unit 130 and any tactile manner for operating the mobile terminal while providing a tactile effect to the user may be employed.

For example, the user input unit 130 may be implemented in the form of a dome switch or a touch pad which is capable of receiving a command or information by a push or touch operation of the user or in the form of a jog wheel for rotating a key, or a joystick. The first to third user input units 130a, 130b and 130c are used to input a command such as start, end, scroll, etc. and the fourth user input unit 130d is used to input choice of an operation mode. The fifth user input unit 130e may function as a hot key for activating a special function of the mobile terminal 100.

Referring to FIG. 3, a second camera 121b may be mounted on a rear surface of the rear case 100-2 and the sixth and seventh user input units 130f and 130g and an interface 170 are disposed on a side surface of the rear case 100-2.

The second camera 121b has a photographing direction substantially opposite to that of the first camera 121a and may have pixels different from those of the first camera 121a. A flash (not shown) and a mirror (not shown) may be further provided near the second camera 121b. Another camera may further be mounted near the second camera 121b to be used to capture a three-dimensional image.

The flash illuminates a subject when the subject is captured using the second camera 121b. The mirror enables the user to view his/her face when the picture of the user is taken by himself/herself using the second camera 121b (self photographing).

In the rear case 100-2, a second audio output module (not shown) may further be included. The second audio output module may perform a stereo function along with the first audio output module 153a and may be used for a call with stereo audio.

The interface 170 may be used as a passage through which data is exchanged with an external device. A broadcast signal reception antenna (not shown) may be provided in one of the front case 100-1 and the rear case 100-2 in addition to an antenna for telephone conversation. The antenna may be retractable from the rear case 100-2.

A power supply 190 for supplying power to the mobile terminal 100 may be mounted at the side of the rear case 100-2. The power supply 190 is, for example, a rechargeable battery and may be detachably coupled to the rear case 100-2, for charging.

Although the second camera 121b is mounted on the rear case 100-2 in the above description, the present invention is not limited thereto. Alternatively, the second camera 121b may not be separately included, but the first camera 121a may be rotatably formed to photograph a subject located in the photographing direction of the second camera 121b.

Figure 4:
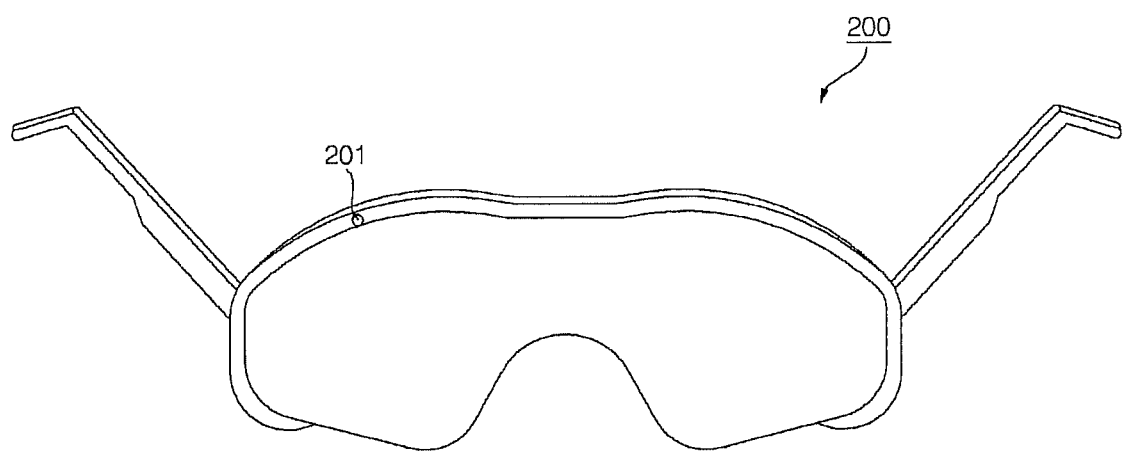
FIGS. 4 to 5 are diagrams showing an example of a head mounted display connectable to a mobile terminal according to the present invention.
Figure 5:
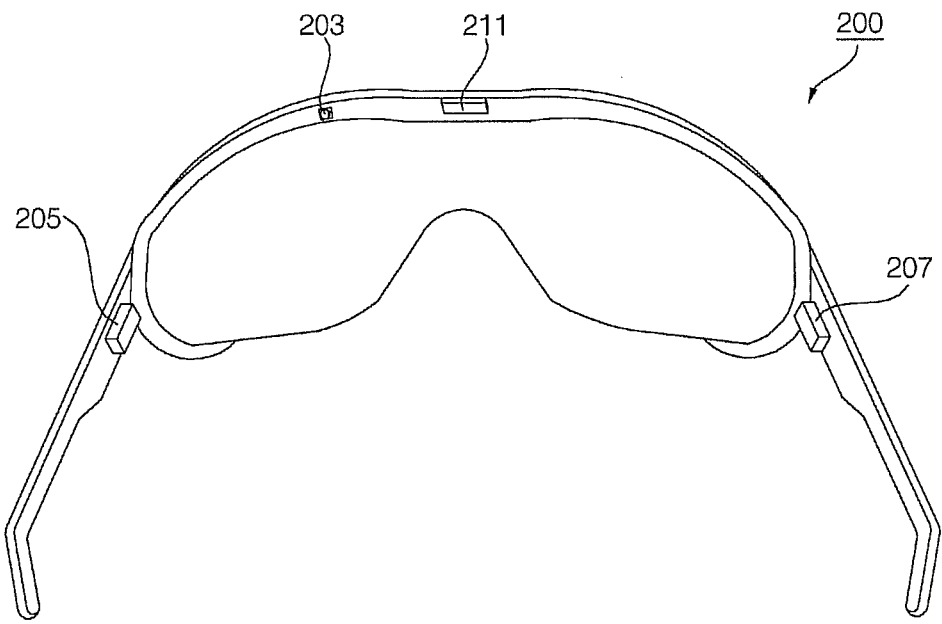
Figure 6:
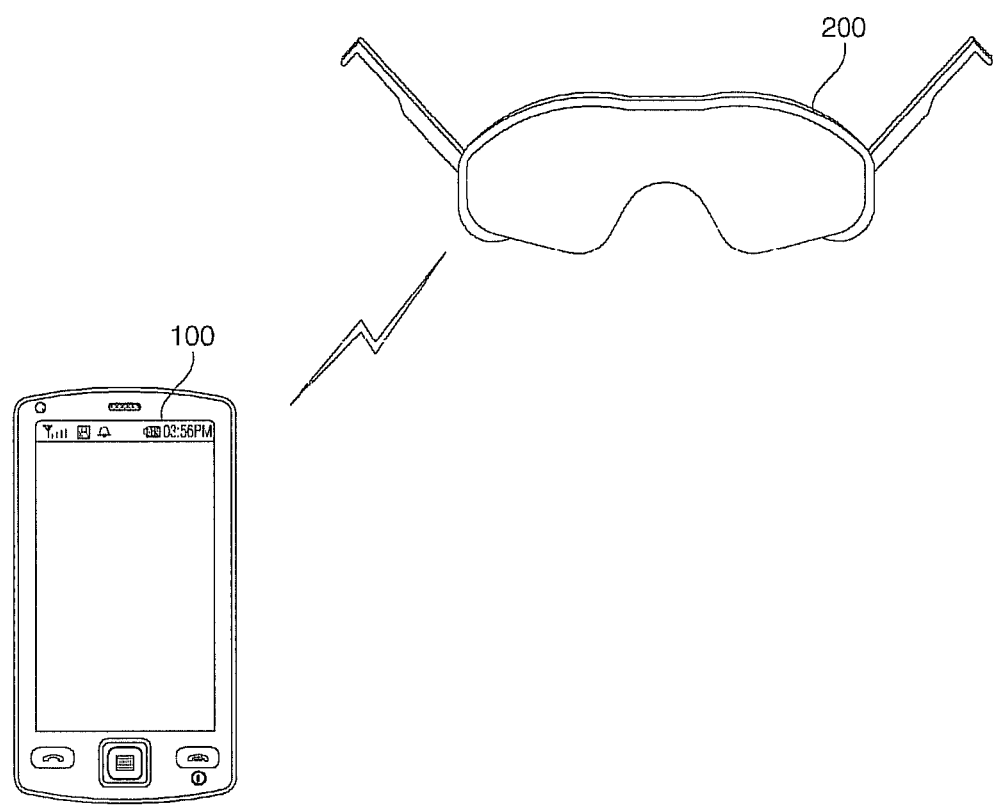
FIG. 6 is a view referred to for describing a method of interconnecting a mobile terminal according to the present invention and a head mounted display.

FIGS. 4 to 5 are diagrams showing an example of a head mounted display connectable to a mobile terminal according to the present invention, and FIG. 6 is a view referred to for describing a method of interconnecting a mobile terminal according to the present invention and a head mounted display.

Referring to FIGS. 4 and 5, the head mounted display 200 connectable to the mobile terminal according to the present invention may be configured in the form of fluoroscopic glasses capable of transmitting external light. The head mounted display 200 includes first and second cameras 201 and 203, first and second image output units 205 and 207 and a head mounted controller 211 for controlling the overall operation of the head mounted display 200.

The first camera 201 may be disposed on a front surface of the head mounted display 200 and may be used for external photographing and the second camera 203 may be disposed on a rear surface of the head mounted display 200 and may be used for user eye tracking. Eye tracking refers to a technique for analyzing an image received through a camera, recognizing the user pupils and tracking the user's eyes. Such eye tracking is used for sports broadcasting or a system for a disabled person, detection of movement or eyes of a consumer, etc. Recently, various algorithms for an eye tracking interface have been studied.

Image data acquired through the first camera 201 may be transmitted to the mobile terminal 100 in real time such that the mobile terminal 100 recognizes a predetermined gesture input according to analysis of the image data received from the head mounted display 200. The gesture input includes an input using a motion gesture such as motion of a user's hand or another approaching object, an input through recognition of the shape or size of a hand or an approaching object or an input using a hand gesture such as specific hand motion.

The mobile terminal 100 detects which point of a real space is viewed by the user through analysis of the image data received from the second camera 203.

The first and second image output units 205 and 207 output an image under the control of the mobile terminal 100 and display an AR screen obtained by combining a virtual image with a real environment by the head mounted display 200.

The head mounted display 200 having the above-described configuration may be communicatively connected to the mobile terminal 100 through NFC such as Bluetooth, as shown in FIG. 6. The head mounted display 200 and the mobile terminal 100 may be connected by wire.

If the head mounted display 200 is communicatively connected to the mobile terminal 100, the head mounted display may display the AR screen and output an audio signal provided by the mobile terminal 100, under the control of the mobile terminal 100. The head mounted display 200 transmits image data acquired through the first and second cameras 201 and 203 to the mobile terminal 100 such that the mobile terminal 100 recognizes user eye tracking and gesture input.

According to use environment, the image acquired through the camera 121 included in the mobile terminal 100 may be displayed on the head mounted display 200. Information indicating an operation state or setting state of the mobile terminal 100 may be displayed on the head mounted display 200. The mobile terminal 100 may generate all data for displaying the AR screen and transmit the data to the head mounted display 200.

Figure 7:
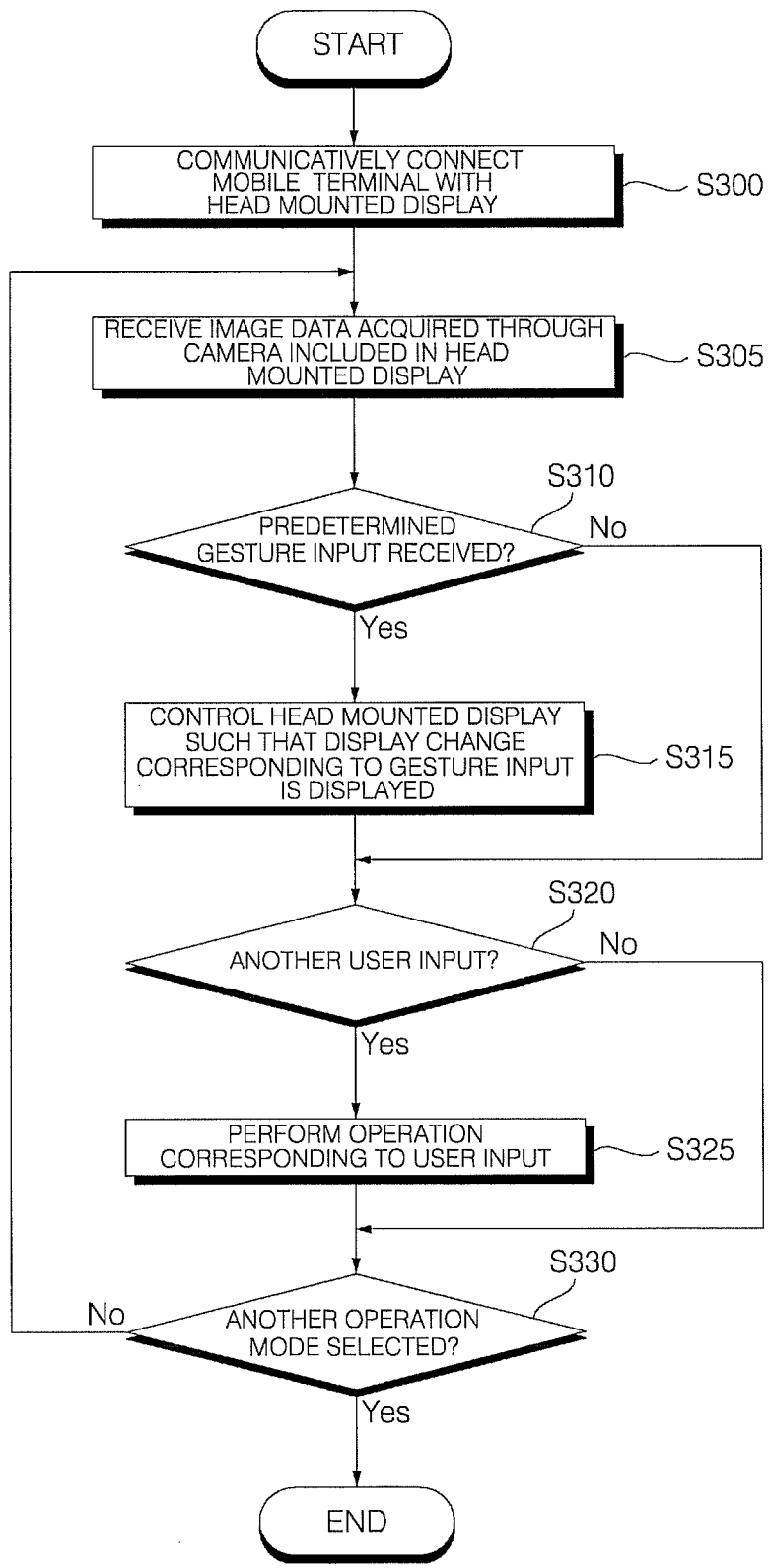
FIGS. 7 and 8 are flowcharts illustrating a method of controlling an operation of a mobile terminal according to an embodiment of the present invention.

FIG. 7 is a flowchart illustrating a method of controlling an operation of a mobile terminal according to an embodiment of the present invention.

Referring to FIG. 7, the controller 180 controls the wireless communication unit 110 according to a user command such that the mobile terminal 100 is communicatively connected to the head mounted display 200 (S300). The mobile terminal 100 and the head mounted display 200 may be communicatively connected through NFC or wired communication.

If the mobile terminal is connectively connected to the head mounted display 200, the controller 180 receives image data acquired through the first camera 201 mounted on the head mounted display 200 (S305). The controller 180 determines whether a predetermined gesture input is received through analysis of the image data received from the head mounted display 200 (8310).

As described above, the gesture input includes an input using a motion gesture such as motion of a user hand or another approaching object, an input through recognition of the shape or size of a hand or an approaching object or an input using a hand gesture such as specific hand motion. Such a gesture input may be set by the user in advance or may be provided as a separate menu.

The gesture input may be recognized through the mobile terminal 100 according to a setting state. That is, a determination as to whether the predetermined gesture input is received through analysis of the image data received through the camera 121 included in the mobile terminal 100.

If it is determined that the predetermined gesture input is received in step S310, the controller 180 controls the head mounted display 200 such that a display change corresponding to the gesture input is displayed on the AR screen (S315).

At this time, the image data received from the second camera 203 included in the head mounted display 200 may be analyzed to detect the eye position of the user and the display change may be displayed at the eye position of the user on the AR screen.

If another user input is received in addition to the gesture input of displaying the display change on the AR screen (S320), the controller 180 performs an operation corresponding to the user input (S325).

This process is repeatedly performed until another operation mode is selected (330). By this process, various operations can be controlled according to the gesture input in a state in which the AR screen is displayed through the head mounted display 200.

Figure 8:
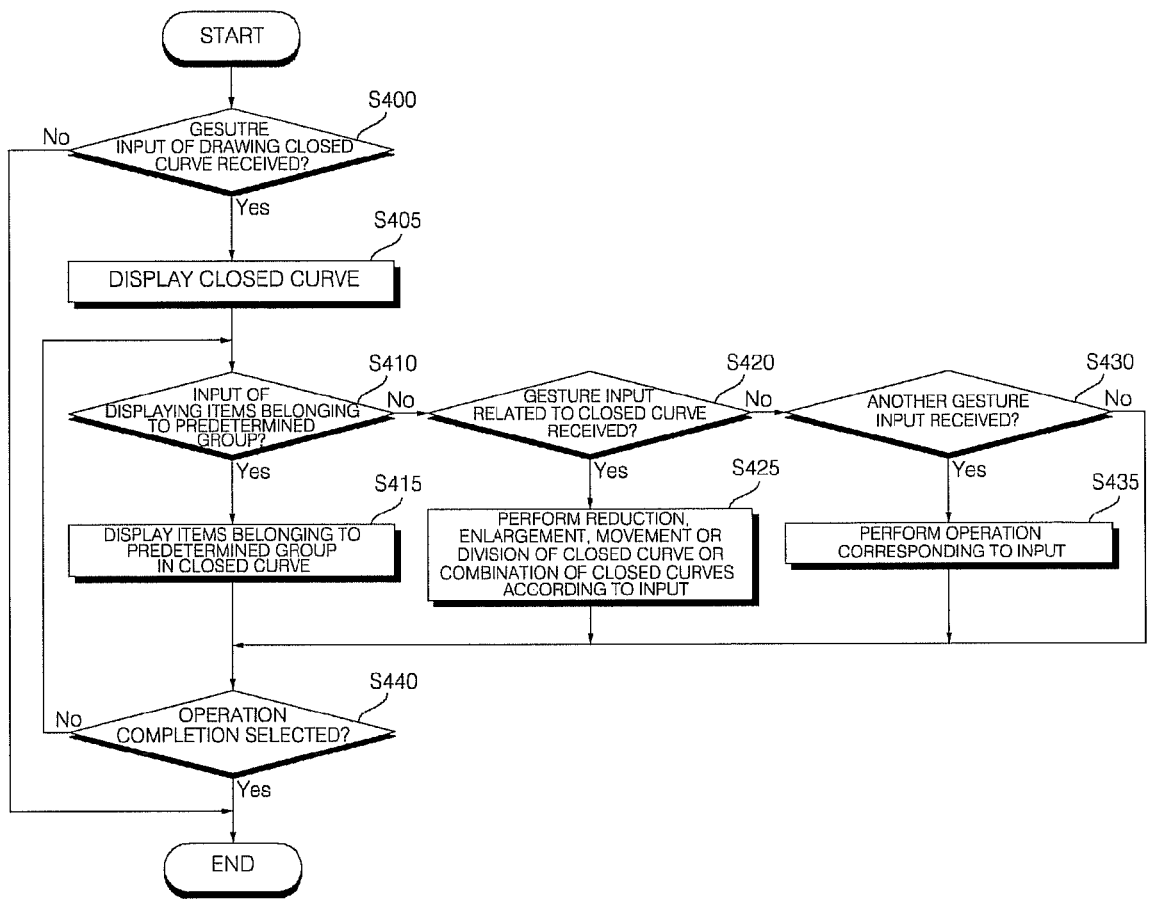

FIG. 8 is a flowchart illustrating an example of an operation according to a gesture input in a method of operating a mobile terminal according to the present invention.

Referring to FIG. 8, if a gesture input of drawing a closed curve in a space according to analysis of image data acquired through the first camera 201 included in the head mounted display 200 in a state in which an AR screen is displayed through the head mounted display 200 (S400), the controller 180 controls the display of the closed curve on the AR screen (S405). At this time, the closed curve may be displayed at a position corresponding to an eye position of a user through eye tracking. As the shape of the closed curve, a circle, an ellipse, etc. may be used and various other shapes may also be used. The shape of the closed curve may be set in advance according to a user command and the shape of displayed content or an icon may be changed according to the shape of the closed curve.

If an input of displaying items belonging to a predetermined group is received (S410), the controller 180 displays the items belonging to the predetermined group in the closed curve of the AR screen (S415). As the input of displaying the items belonging to the predetermined group, an input of touching items displayed on the display 151 and then dragging the items to the closed curve displayed on the AR screen may be used.

If a gesture input associated with the closed curve is received (S410), the controller 180 controls enlargement, reduction, movement or division of the closed curve or combination of divided closed curves (S425). Such a gesture input may be set by a user in advance.

If another gesture input is received (S430), the controller 180 performs an operation corresponding to the received gesture input (S435). Examples of another gesture input include an input of touching any one of the items displayed in the closed curve and performing an operation corresponding to the touched item.

This process is repeatedly performed until the user selects operation completion (S440). Various operations can be controlled using the predetermined gesture inputs in a state of displaying the AR screen.

FIGS. 9 to 18 are views referred to for describing a method of controlling an operation of a mobile terminal according to an embodiment of the present invention.

Figure 9:
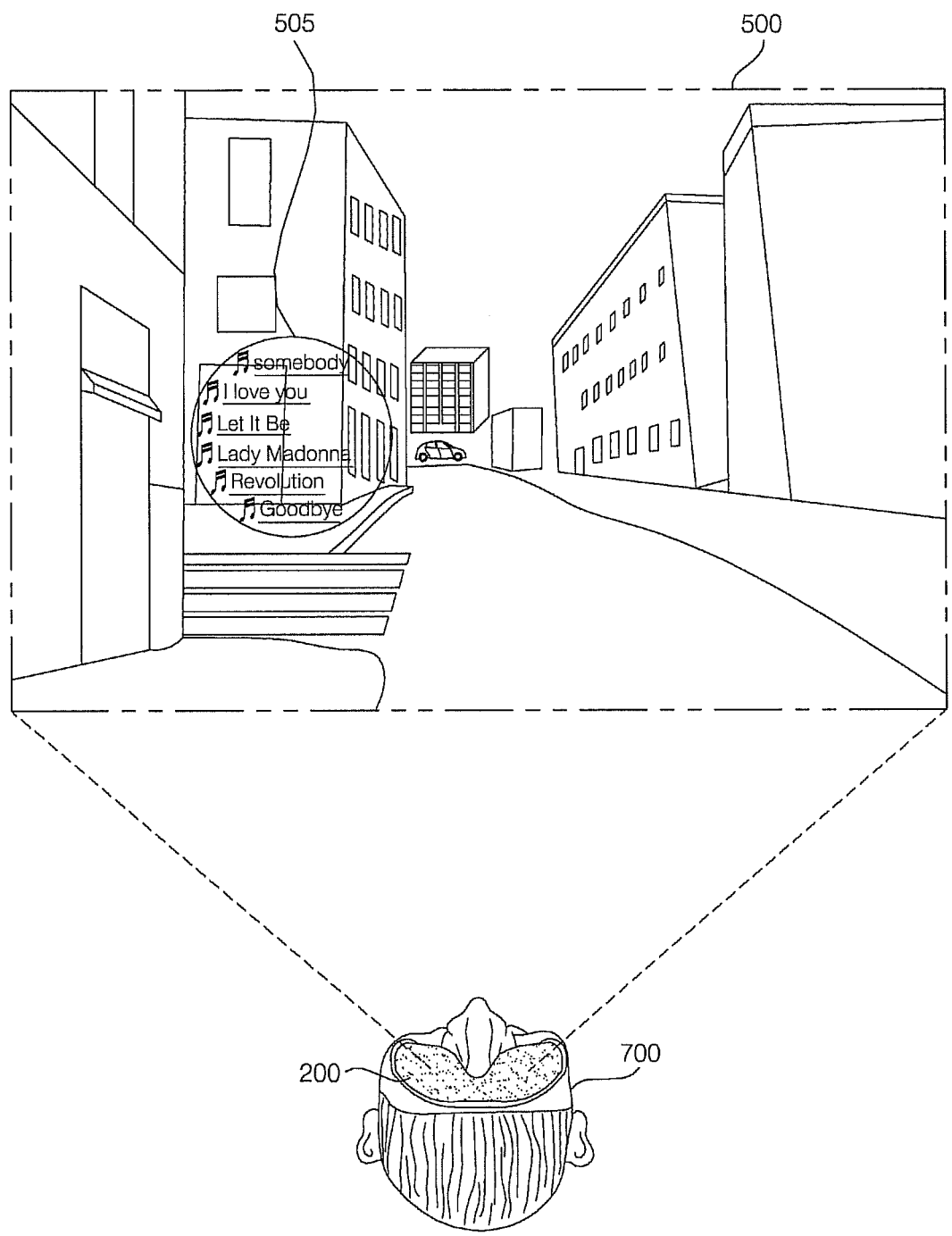
FIGS. 9 to 21 are views referred to for describing a method of controlling an operation of a mobile terminal according to an embodiment of the present invention.

FIG. 9 shows an AR screen. As shown in FIG. 9, a user 700 wears a glasses type head mounted display 200 and views the AR screen 500 in which a virtual image 505 is combined with a real environment. The virtual image 505 displayed on the AR screen 500 may be displayed at a position corresponding to an eye position of the user 700 through eye tracking.

Figure 10:
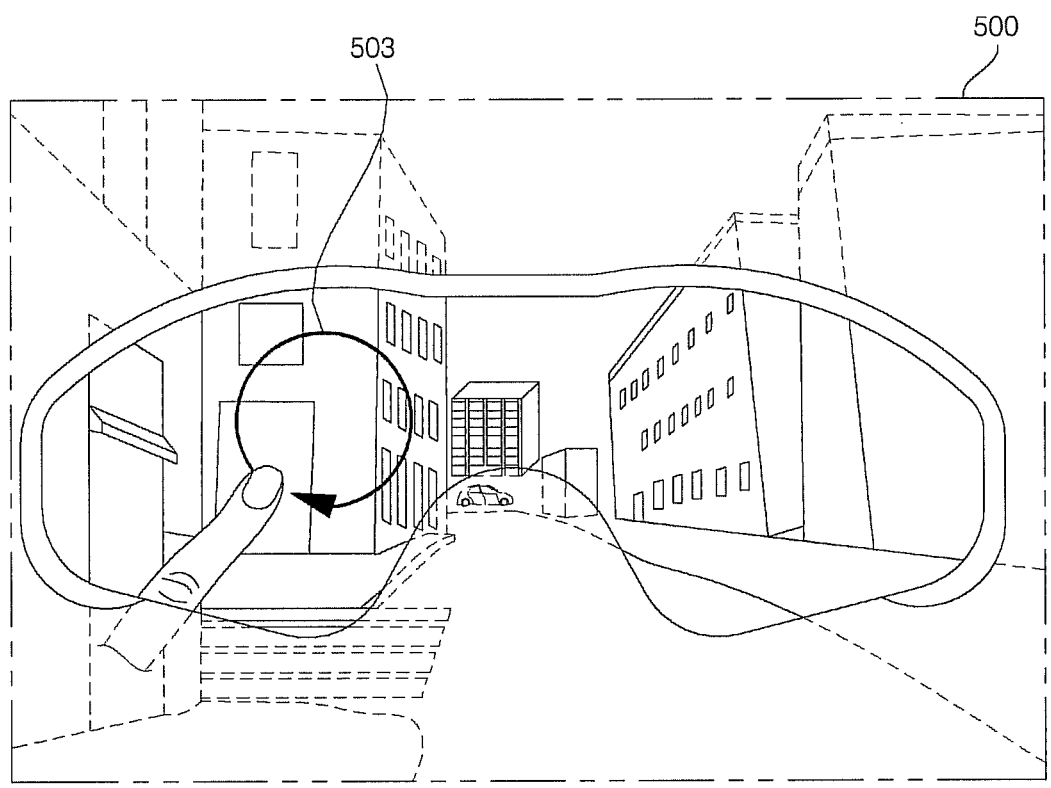
Figure 11:
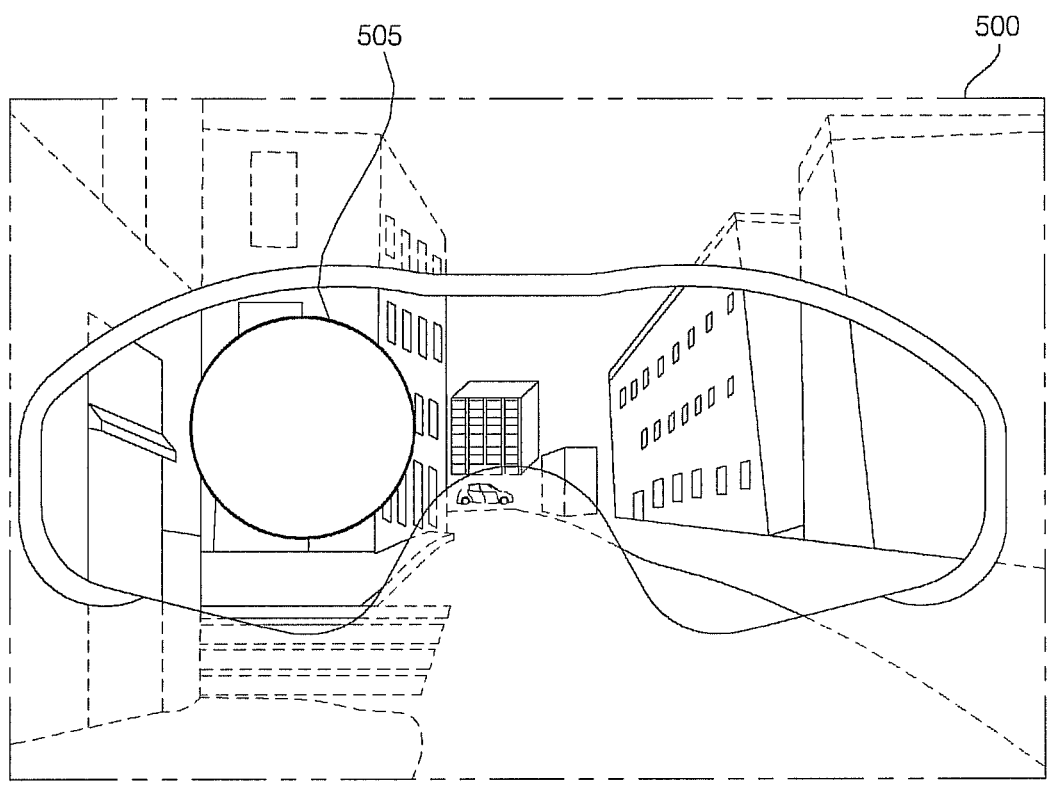

FIG. 10 shows a gesture input 503 of drawing a closed curve in a real space. If the gesture input 503 is received, as shown in FIG. 11, the closed curve 505 is displayed on the AR screen 500. At this time, the closed curve 505 may be displayed at a position corresponding to the eye position of the user through eye tracking. The closed curve 505 may be opaque or semitransparent or may be displayed with a predetermined color according to settings.

Figure 12:
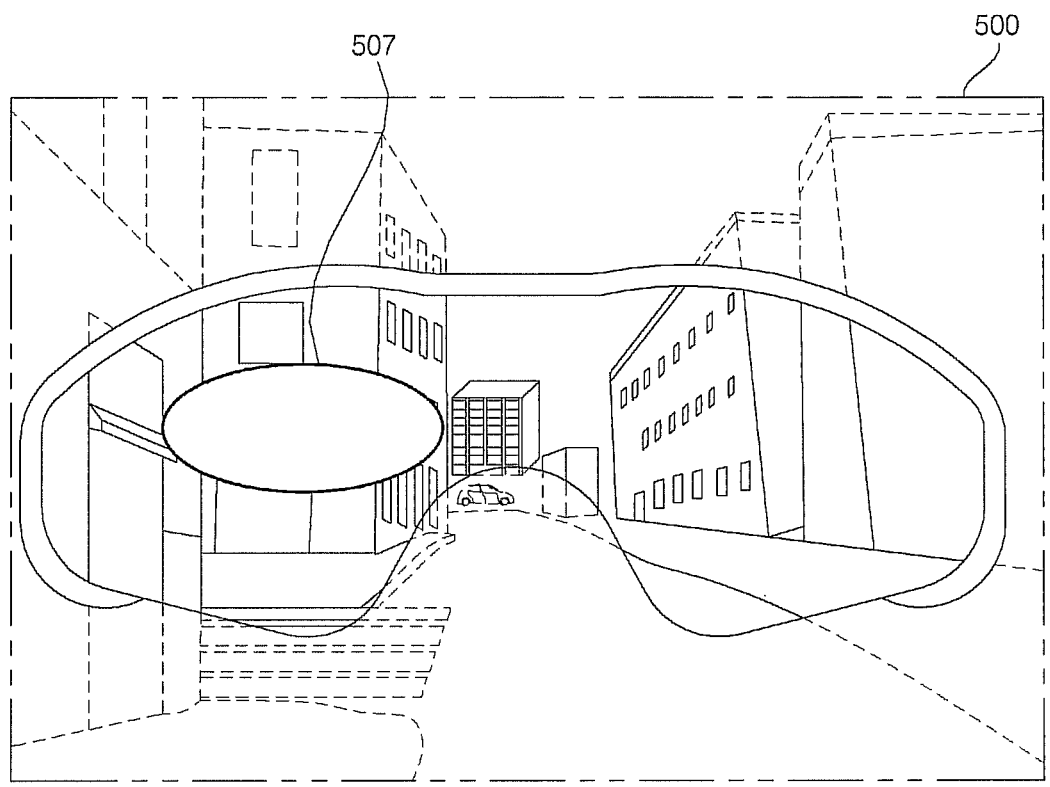

As shown in FIG. 12, the shape of the closed curve 507 may be a circle, an ellipse, etc. If the shape of the closed curve is changed, the kind of contents displayed in the closed curve may be changed.

Figure 13:
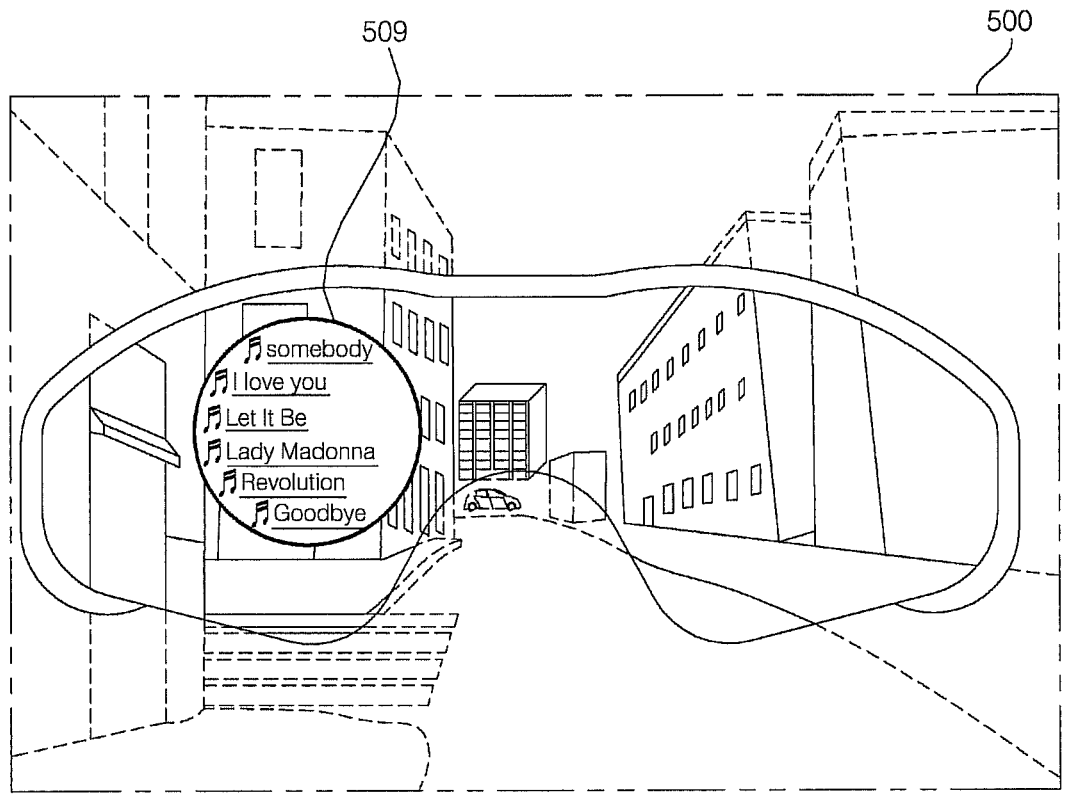
Figure 13:
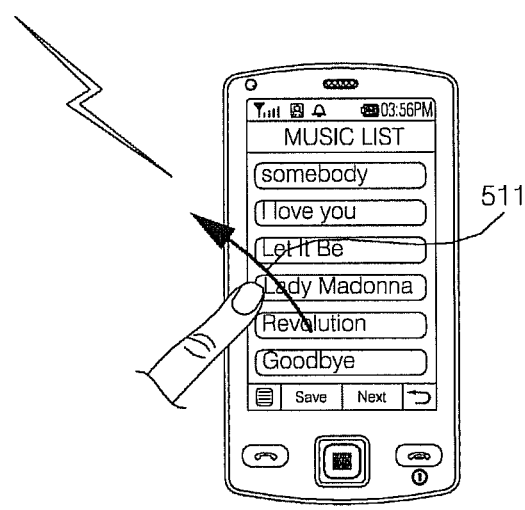

As shown in FIG. 13, if an input 511 of touching items displayed on the display 151 of the mobile terminal 100 and then dragging the items to the closed curve 509 is received, a predetermined number of items corresponding to a predetermined group may be displayed in the closed curve 509.

For example, photos, content, music, text messages, memos, e-mails or other file items stored in the mobile terminal 100 are displayed in the closed curve 509 and operations related thereto are performed.

The items belonging to the predetermined group may be displayed in the closed curve 509. For example, music files may be sorted and displayed on an artist basis, on an album basis or on a release year basis. According to a list alignment method, a group to be displayed in the closed curve 509 may be initially automatically displayed.

Figure 14:
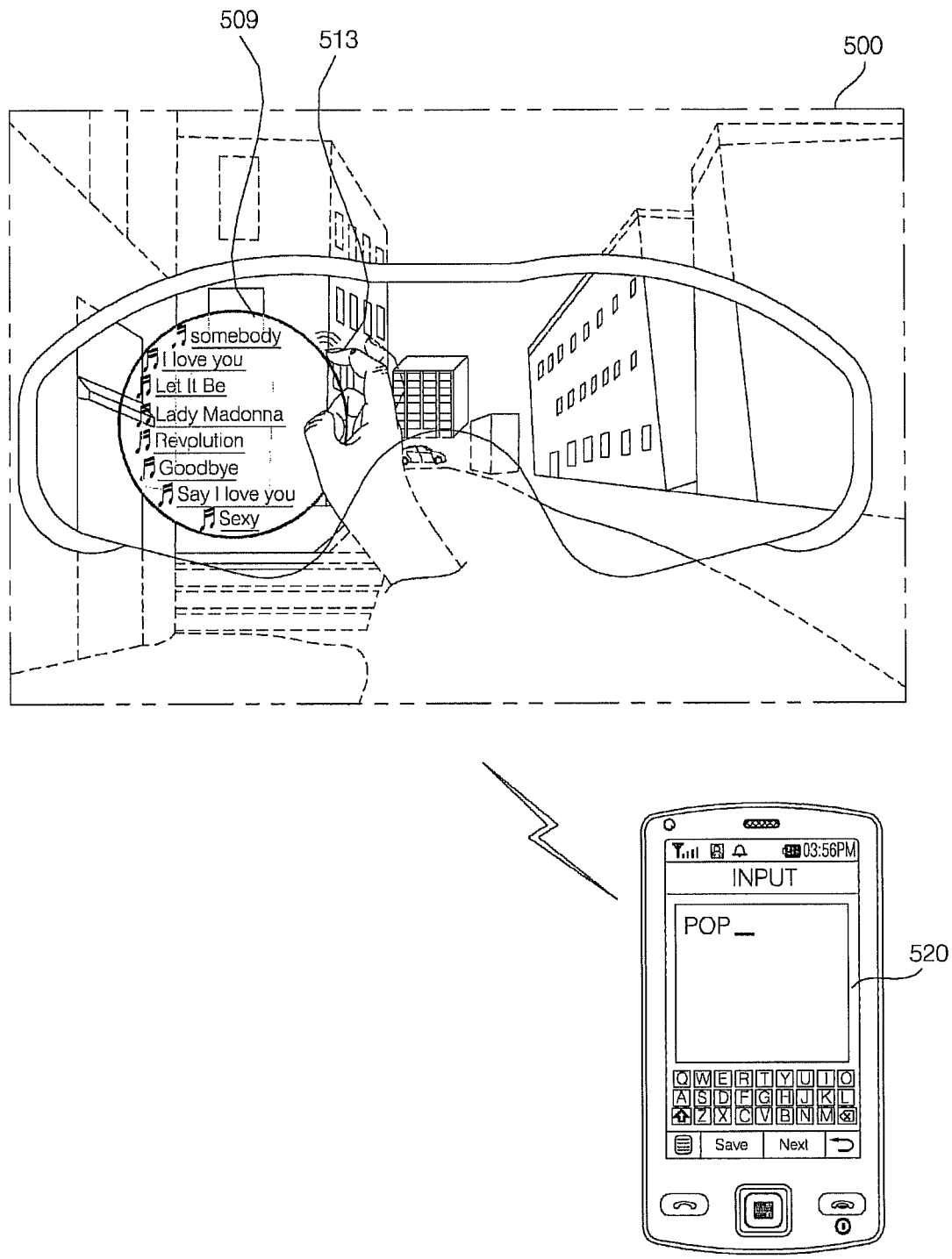

As shown in FIG. 14, if a gesture input 513 of tapping a boundary of the closed curve 509 a predetermined number of times is received, a tag for the closed curve 509 may be set. At this time, the name of the tag may be input through a text input window 530 displayed on the mobile terminal 100 and a separate menu related thereto may be displayed on the AR screen 500.

Figure 15:
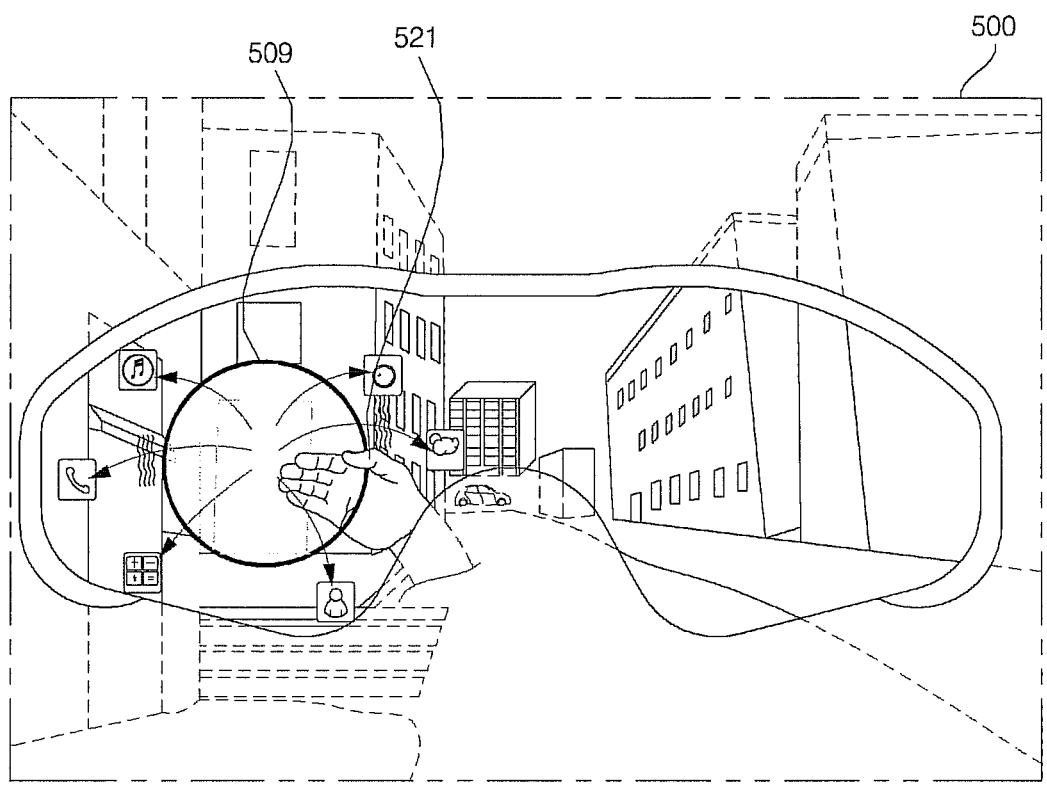

As shown in FIG. 15, if a gesture input 521 of shaking the closed curve 509 is received, the items displayed in the closed curve 509 may be displayed outside the closed curve 509. In this case, the items may be enlarged or images related thereto may be displayed such that the user easily browses for a desired item.

If the gesture input of shaking the closed curve 509 is received again, the items displayed outside the closed curve 509 may be moved to the inside of the closed curve 509.

Figure 16:
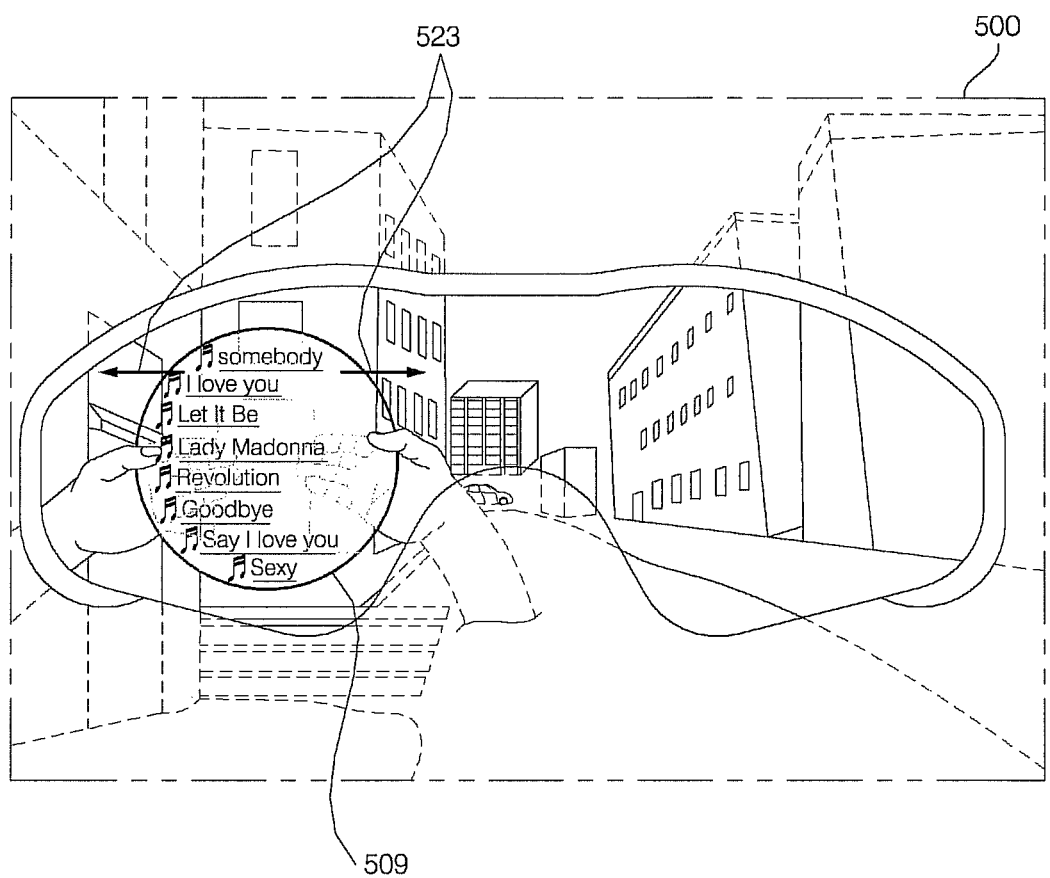

As shown in FIG. 16, if a gesture input 523 of pulling the closed curve 509 outward is received, the closed curve 509 may be enlarged. If the closed curve 509 is enlarged to a predetermined size or more by the gesture input 523, a new item may further be inserted into the closed curve 509 or any one of the items displayed in the closed curve 509 may be removed. If the size of the closed curve 509 is increased, compressed files included in the closed curve 509 may be uncompressed and displayed.

Figure 17:
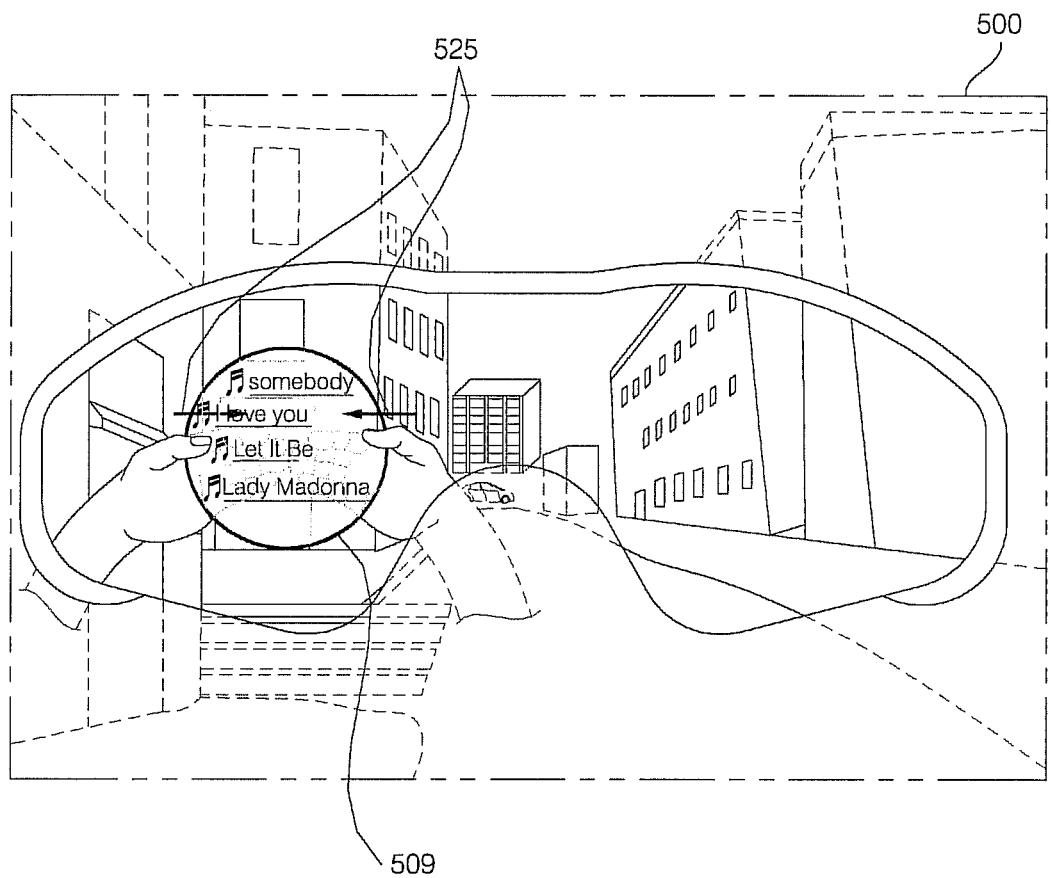

As shown in FIG. 17, if a gesture input 525 of pushing the closed curve 509 inward is received, the closed curve 509 may be reduced. If the closed curve 509 is reduced to a predetermined size or less by the gesture input 525, a new item may not be further inserted into the closed curve 509 or any one of the items displayed in the closed curve 509 may not be removed. The reduction of the size of the closed curve 509 means that the user is unconcerned with the items in the group for the present being and thus the files corresponding to the items in the closed curve may be compressed and displayed.

Figure 18:
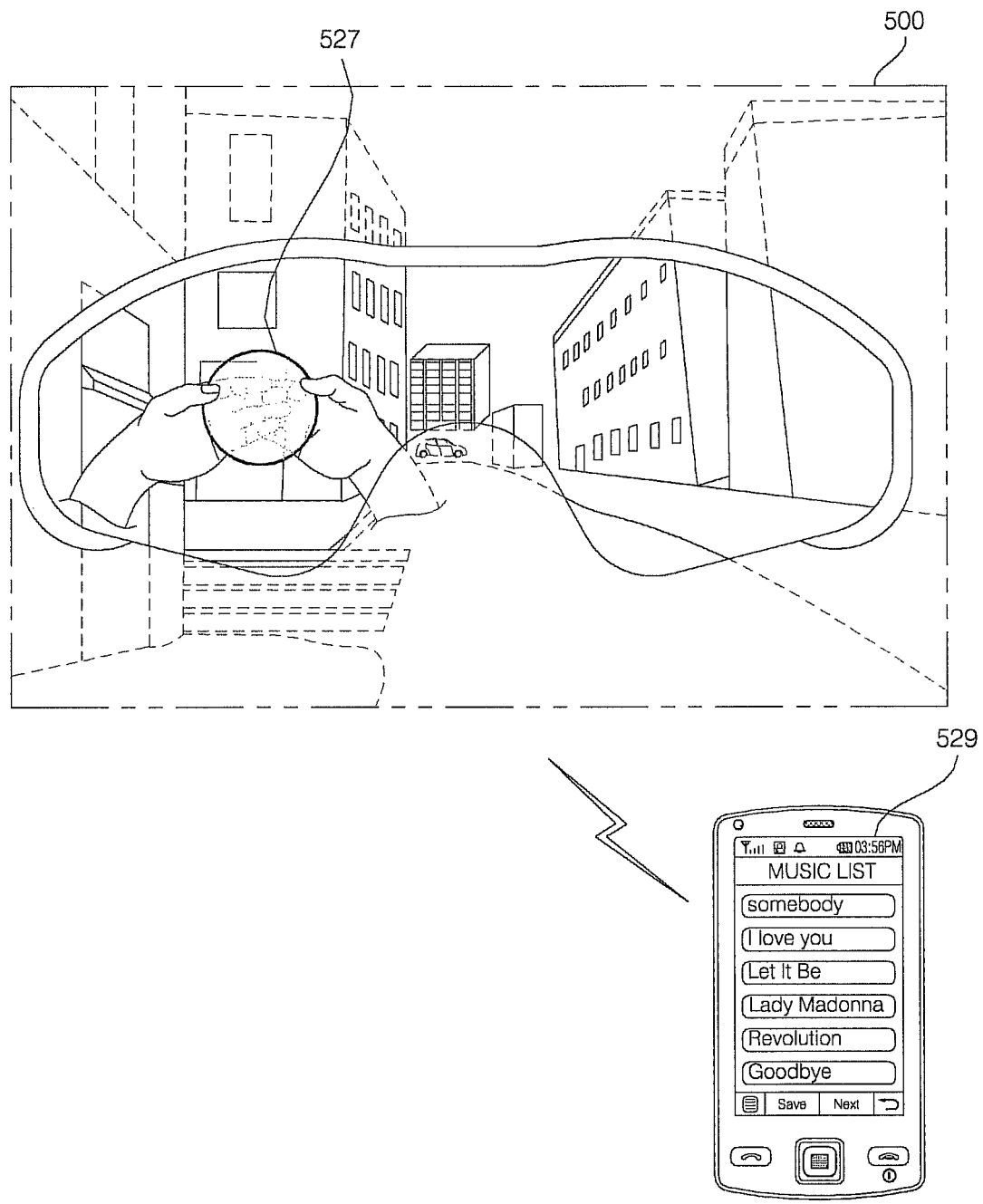

As shown in FIG. 18, if the closed curve is reduced to a predetermined size or less by a gesture input of pushing the closed curve toward a center of the closed curve, the contents displayed in the closed curve may be displayed on a screen 529 of the mobile terminal 100.

Figure 19:
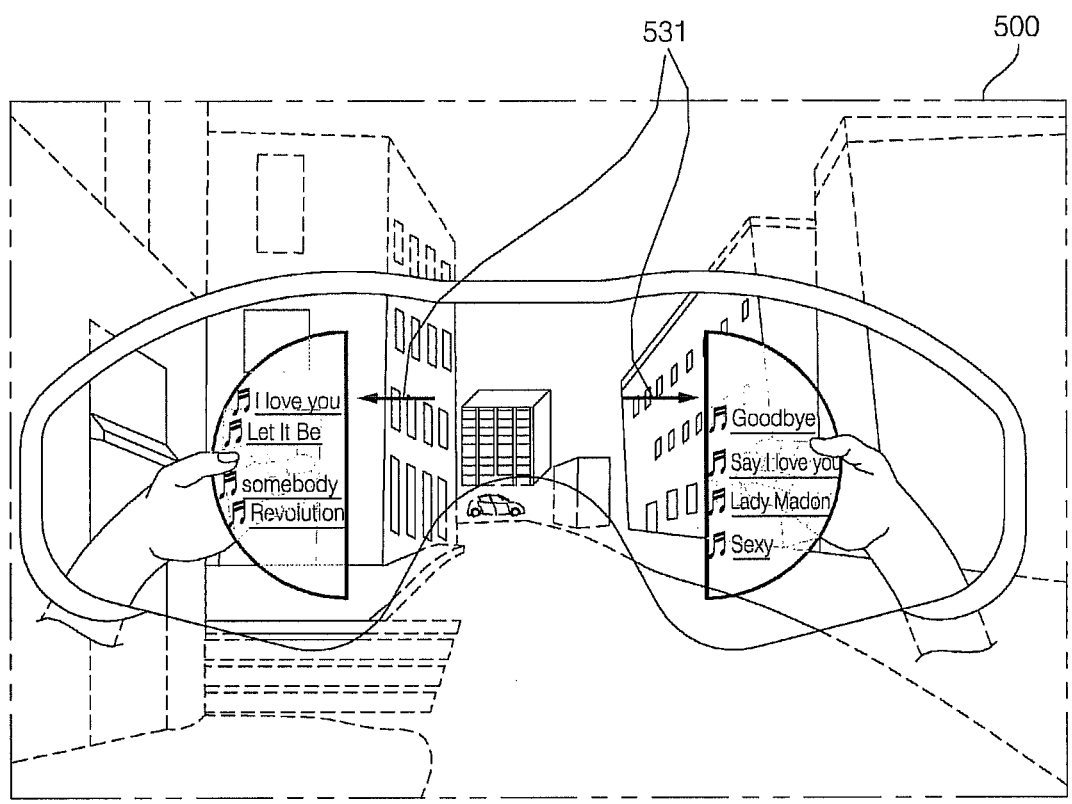

As shown in FIG. 19, if a gesture input 531 of twisting the closed curve 509 and pulling the closed curve outward is received, the closed curve may be divided into two closed curves, which are then displayed on the AR screen 500. In this case, the items may be divided into the two closed curves to be displayed or all the items may be displayed in any one of the two closed curves and the other closed curve may be empty.

Figure 20:
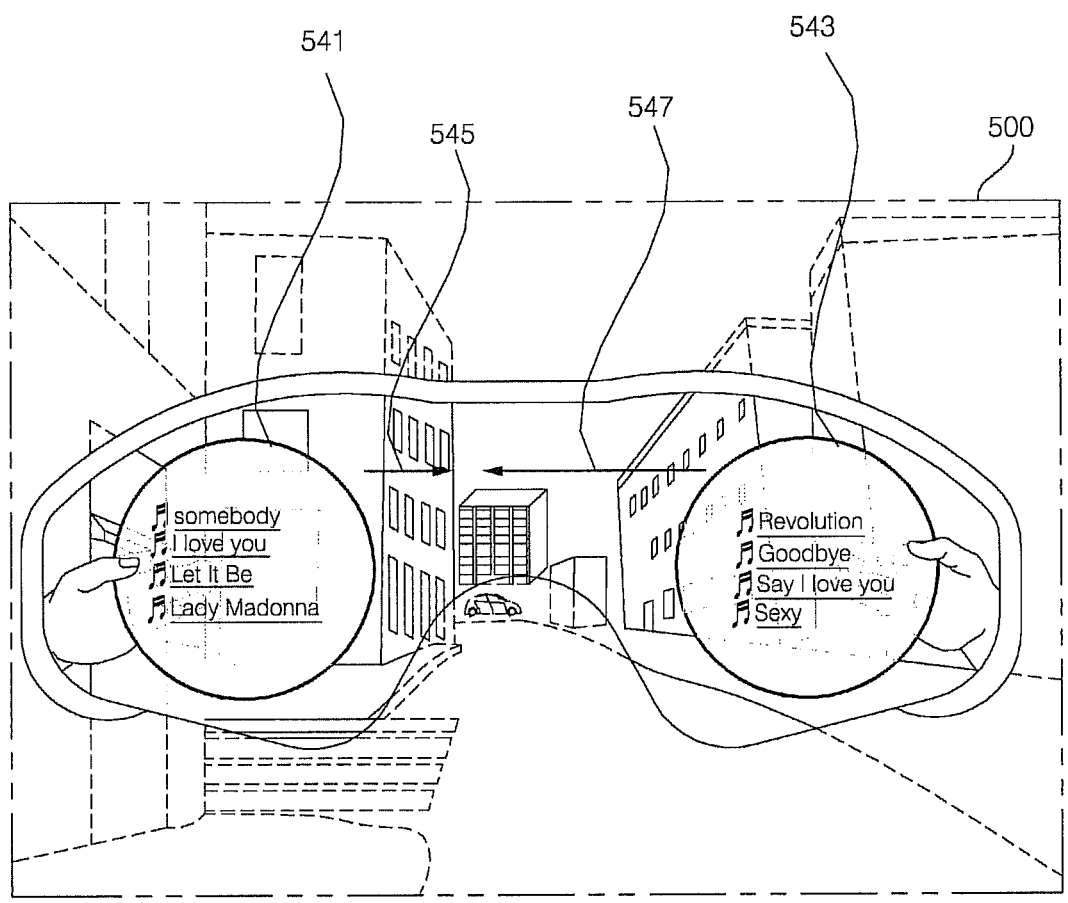
Figure 21:
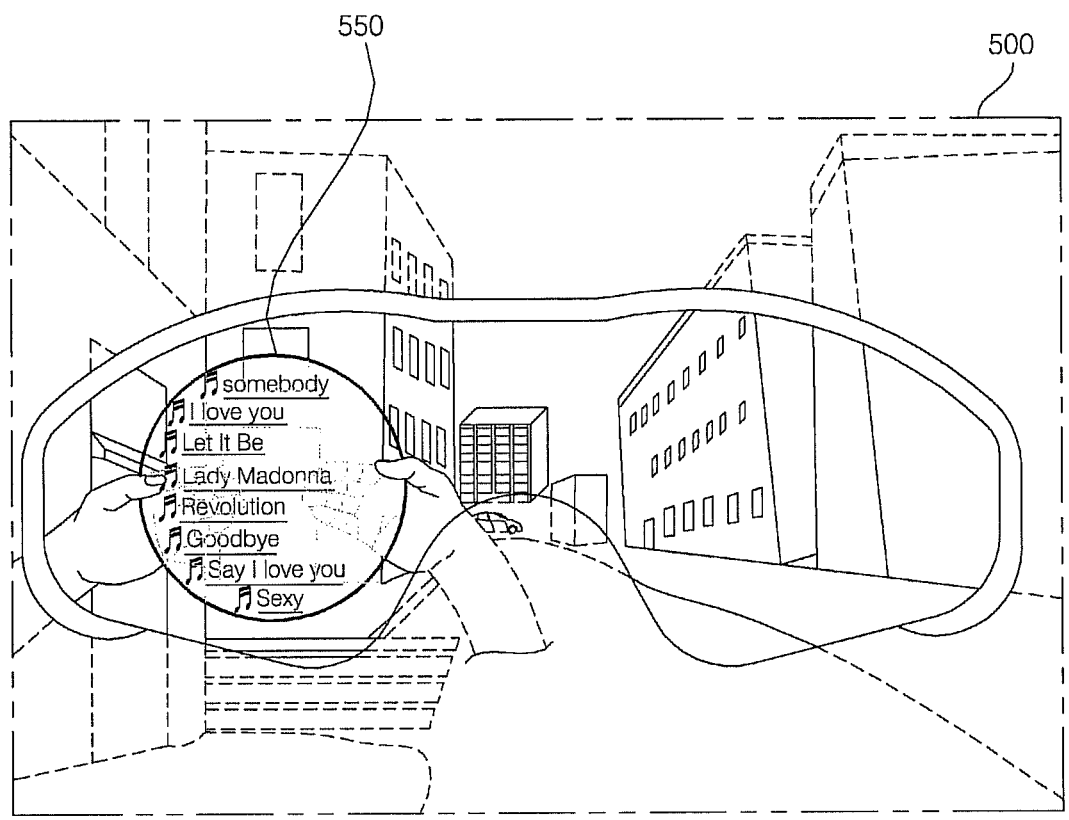

FIG. 20 shows the case in which gesture inputs 545 and 547 of inserting any one of a first closed curve 541 and a second closed curve 543 into the other closed curve are received. If the gesture inputs 545 and 547 are received, as shown in FIG. 21, the first and second closed curves 541 and 545 may be combined into one closed curve 550.

If the closed curves are combined, the items displayed in the divided closed curves may be combined and displayed in one closed curve. If an item displayed in a closed curve is moved onto another closed curve, the group of the moved items may be processed to be changed. A music file may be moved from an initial group which is automatically set to a closed curve newly generated by a user through duplication, not through group movement. A music file may be moved between user groups through group movement or may be stored in several groups through duplication.

Another closed curve may be displayed in one closed curve. In this case, if items displayed in the small closed curve included in the large closed curve are not seen, the items may be enlarged and displayed at the outside of the closed curve by tapping the boundary of the closed curve.

In addition, if a stereoscopic 3D image is displayed on the mobile terminal 100, a menu or icons associated with the stereoscopic 3D image may be displayed on the head mounted display 200. The stereoscopic 3D image refers to an image which is displayed on a monitor or a screen with the same depth and reality of an object as a real space.

Various operations can be controlled on an AR screen using gesture inputs. The mobile terminal and the method for controlling the operation thereof according to the foregoing embodiments are not restricted to the embodiments set forth herein. Therefore, variations and combinations of the exemplary embodiments set forth herein may fall within the scope of the present invention.

The method for operating an image display apparatus according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disc, optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

As described above, according to the present invention, in a state in which an AR screen is displayed through a head mounted display communicatively connected to a mobile terminal, various operations related to the mobile terminal may be controlled using a gesture input such as predetermined hand motion. Eye tracking is performed on the AR screen displayed through the head mounted display and a virtual image related to the gesture input is displayed at an eye position of a user. Thus, the user can conveniently control an operation related to the mobile terminal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling an operation of a mobile terminal, the method comprising:
    communicatively connecting the mobile terminal with a head mounted display for displaying an augmented reality (AR) screen;
    receiving first data from the head mounted display, the received first data includes gesture input data acquired by a first camera at the head mounted display and image data of an image corresponding to an environment acquired by the first camera;
    receiving second data from the head mounted display, the received second data includes image data acquired by a second camera at the head mounted display;
    analyzing the first and second data;
    determining a predetermined gesture based on the analyzed first data and determining an eye position of a user based on the analyzed second data; and
    controlling the head mounted display to display an indicator corresponding to a shape of the determined gesture on the AR screen, wherein the indicator is displayed at the determined eye position of the user, and wherein the controlling of the head mounted display includes controlling the head mounted display to display a closed curve region on the AR screen when the predetermined gesture is determined to correspond to a closed curve gesture.

2. The method according to claim 1, wherein the first camera is disposed on a front surface of the head mounted display, and the second camera is disposed on a rear surface of the head mounted display.

3. The method according to claim 1, further comprising displaying items belonging to a specific group in the closed curve region according to a predetermined user input.

4. The method according to claim 3, wherein the predetermined user input includes an input of touching a display of the mobile terminal and performing a dragging operation to the closed curve region.

5. The method according to claim 1, further comprising displaying a menu for setting a tag corresponding to the closed curve region on the AR screen in response to a gesture input of tapping a boundary of the closed curve region a predetermined number of times.

6. The method according to claim 5, wherein the menu is displayed on a display of the mobile terminal.

7. The method according to claim 1, further comprising enlarging and displaying items displayed in the closed curve region at the outside of the closed curve region in response to a gesture input of shaking the closed curve region.

8. The method according to claim 1, further comprising reducing and displaying the closed curve region on the AR screen in response to a gesture input of pushing a boundary of the closed curve region inward.

9. The method according to claim 1, further comprising enlarging and displaying the closed curve region on the AR screen in response to a gesture input of pulling a boundary of the closed curve region outward.

10. The method according to claim 1, further comprising dividing the closed curve region into first and second closed curve regions and displaying the divided closed curve regions on the AR screen in response to a gesture input of twisting and then pulling the closed curve region outward.

11. The method according to claim 10, further comprising combining the first and second closed curve regions into one closed curve region and displaying the combined closed curve region on the AR screen in response to a gesture input of moving the first closed curve region onto the second closed curve region.

12. The method according to claim 1, wherein the AR screen combines a virtual image and the image corresponding to the environment.

13. The method according to claim 1, wherein the closed curve region is in a shape of one of a circle or an ellipse.

14. A mobile terminal comprising:
    a wireless communication unit configured to communicatively connect the mobile terminal with a head mounted display for displaying an augmented reality (AR) screen; and
    a controller configured to:
        receive first data from the head mounted display, the received first data includes gesture input data acquired by a first camera at the head mounted display and image data of an image corresponding to an environment acquired by the first camera;
        receive second data from the head mounted display, the received second data includes image data acquired by a second camera at the head mounted display;
        analyze the first and second data;
        determine a predetermined gesture based on the analyzed first data and determine an eye position of a user based on the analyzed second data; and
        control the head mounted display to display an indicator corresponding to a shape of the determined gesture on the AR screen, wherein the indicator is displayed at the determined eye position of the user, and wherein the controller enables to display a closed curve region on the AR screen when the predetermined gesture is determined to correspond to a closed curve gesture.

15. The mobile terminal according to claim 14, wherein the second camera is configured to perform eye tracking of the user.

16. The mobile terminal according to claim 14, wherein the controller enables to display items belonging to a specific group in the closed curve region when a gesture input of touching a display and then performing a dragging operation to the closed curve region is detected.

17. The mobile terminal according to claim 14, wherein the controller divides the closed curve region into first and second closed curve regions and enables to display the divided closed curve regions on the AR screen, when a gesture input of twisting and then pushing the closed curve region outward is detected.

18. The mobile terminal according to claim 14, wherein the AR screen combines a virtual image and the image corresponding to the environment.

19. The mobile terminal according to claim 14, wherein the closed curve region is in a shape of one of a circle or an ellipse.

20. A mobile terminal comprising:
a wireless communication unit configured to communicatively connect the mobile terminal with a head mounted display for displaying an augmented reality (AR) screen; and
a controller configured to receive data from the head mounted display, the received data includes gesture input data acquired by a camera at the head mounted display and image data of an image corresponding to an environment acquired by the camera, the controller to analyze the data and determine a predetermined gesture based on the analyzed data, and to control the head mounted display on the AR screen based on the determined gesture,
wherein the controller enables to display a closed curve region on the AR screen when the predetermined gesture is determined to correspond to a closed curve gesture, and
wherein the controller enables to display a text input window for attaching a tag to the closed curve region on a display and sets text input through the text input window as a tag of the closed curve region, when a gesture input of tapping a boundary of the closed curve region is detected.

21. A system comprising:
a head mounted display configured to display an augmented reality (AR) screen; and
a mobile terminal communicatively connected to the head mounted display and configured to:
receive first data from the head mounted display, the received first data includes gesture input data acquired by a first camera at the head mounted display and image data of an image corresponding to an environment acquired by the first camera;
receive second data from the head mounted display, the received second data includes image data acquired by a second camera at the head mounted display;
analyze the first and second data;
determine a predetermined gesture based on the analyzed first data, and determine an eye position of a user based on the analyzed second data; and
control the head mounted display to display an indicator corresponding to a shape of the determined gesture on the AR screen, wherein the indicator is displayed at the determined eye position of the user, and wherein the mobile terminal controls the head mounted display to display a closed curve region on the AR screen when the predetermined gesture is determined to correspond to a closed curve gesture.

22. The system according to claim 21, wherein the second camera is configured to perform eye tracking of a user.

23. The system according to claim 21, wherein the AR screen combines a virtual image and the image corresponding to the environment.

24. The system according to claim 21, wherein the closed curve region is in a shape of one of a circle or an ellipse.

* * * * *